(12) United States Patent
Lee et al.

(10) Patent No.: US 12,183,952 B2
(45) Date of Patent: Dec. 31, 2024

(54) BATTERY PACK WITH ENHANCED STRUCTURE FOR PREVENTING SHORT CIRCUIT AND SHOCK

(71) Applicant: LG ENERGY SOLUTION, LTD., Seoul (KR)

(72) Inventors: Kwang-Bae Lee, Daejeon (KR); Young-Su Son, Daejeon (KR); Kun-Joo Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 538 days.

(21) Appl. No.: 17/617,259

(22) PCT Filed: Sep. 16, 2020

(86) PCT No.: PCT/KR2020/012509
§ 371 (c)(1),
(2) Date: Dec. 7, 2021

(87) PCT Pub. No.: WO2021/071120
PCT Pub. Date: Apr. 15, 2021

(65) Prior Publication Data
US 2022/0231382 A1  Jul. 21, 2022

(30) Foreign Application Priority Data
Oct. 10, 2019  (KR) .................. 10-2019-0125483

(51) Int. Cl.
*H01M 50/503* (2021.01)
*H01M 10/613* (2014.01)
(Continued)

(52) U.S. Cl.
CPC ....... *H01M 50/503* (2021.01); *H01M 10/613* (2015.04); *H01M 10/625* (2015.04);
(Continued)

(58) Field of Classification Search
CPC ............ H01M 50/503; H01M 10/613; H01M 10/625; H01M 10/6554; H01M 50/572; H01M 2220/20
(Continued)

(56) References Cited

U.S. PATENT DOCUMENTS

2009/0155680 A1  6/2009  Maguire et al.
2013/0230761 A1  9/2013  Okutani et al.
(Continued)

FOREIGN PATENT DOCUMENTS

CN  206685458 U  11/2017
JP  2010-67515 A   3/2010
(Continued)

OTHER PUBLICATIONS

International Search Report issued in corresponding International Patent Application No. PCT/KR2020/012509, dated Jan. 4, 2021.
(Continued)

*Primary Examiner* — Christian Roldan
*Assistant Examiner* — Robert Gene West
(74) *Attorney, Agent, or Firm* — Morgan, Lewis & Bockius LLP

(57) ABSTRACT

Disclosed is a battery pack, which includes a plurality of cell assemblies respectively having a cell housing for accommodating battery cells and arranged in a front and rear direction; a first metal plate mounted at a top portion of the cell housing and integrally contacting upper electrode terminals of the battery cells; and a second metal plate mounted at a bottom portion of the cell housing and integrally contacting lower electrode terminals of the battery cells. The cell housing includes a side portion that has a slit forming a gap into which a part of the first metal plate and a part of the second metal plate are bent and inserted in an upper and lower direction and a perforated hole formed in a direction (Continued)

intersecting the slit. The bent part of the first metal plate mounted to any one cell housing is overlapped with the bent part of the second metal plate mounted to another the cell housing adjacent thereto inside the perforated hole.

12 Claims, 9 Drawing Sheets

(51) Int. Cl.
  *H01M 10/625* (2014.01)
  *H01M 10/6554* (2014.01)
  *H01M 50/572* (2021.01)
(52) U.S. Cl.
  CPC ..... *H01M 10/6554* (2015.04); *H01M 50/572* (2021.01); *H01M 2220/20* (2013.01)
(58) Field of Classification Search
  USPC .......................................................... 429/120
  See application file for complete search history.

(56) References Cited

U.S. PATENT DOCUMENTS

| 2016/0111762 | A1  | 4/2016  | Kawakami et al. |
| 2016/0181579 | A1* | 6/2016  | Geshi ................ H01M 50/581 429/61 |
| 2017/0200926 | A1  | 7/2017  | Motokawa et al. |
| 2017/0346139 | A1* | 11/2017 | Kobayashi .......... H01M 10/281 |
| 2018/0130981 | A1  | 5/2018  | Liu et al. |
| 2018/0366711 | A1  | 12/2018 | Igarashi |
| 2020/0014006 | A1* | 1/2020  | Oliveira .............. H01M 10/625 |
| 2021/0194100 | A1  | 6/2021  | Yoon |

FOREIGN PATENT DOCUMENTS

| JP | WO2012/164837 A1 | 12/2012 |
| JP | WO2013077205 A1  | 5/2013  |
| JP | WO2016/031208 A1 | 3/2016  |
| JP | 201681771 A      | 5/2016  |
| JP | 2017-212064 A    | 11/2017 |
| JP | 2018-206495 A    | 12/2018 |
| KR | 10-2007-0120106 A | 12/2007 |
| KR | 10-2018-0055671 A | 5/2018  |
| KR | 10-2019-0042341 A | 4/2019  |

OTHER PUBLICATIONS

Extended European Search Report issued in corresponding European Patent Application No. 20874985.3, dated Sep. 19, 2022. Note: No. 20180130981 was previously cited.

* cited by examiner

BATTERY PACK WITH ENHANCED STRUCTURE FOR PREVENTING SHORT CIRCUIT AND SHOCK

TECHNICAL FIELD

The present application claims priority to Korean Patent Application No. 10-2019-0125483 filed on Oct. 10, 2019 in the Republic of Korea, the disclosures of which are incorporated herein by reference.

The present disclosure relates to a battery pack, and more particularly, to a battery pack having a short circuit preventing structure capable of settling anxiety of a short circuit caused by an external impact applied while battery cells are being electrically connected or used.

BACKGROUND ART

A secondary battery has high applicability to various product groups and has an electrical characteristic of high energy density. The secondary battery is applied not only to portable electronic devices but also to an electric vehicle, a hybrid electric vehicle, an energy storage system, and the like driven by an electric drive source.

The secondary battery is attracting attention as a new energy source for eco-friendliness and energy efficiency enhancement in that no by-product is generated due to energy use, in addition to a primary advantage of greatly reducing the use of fossil fuels.

A battery pack applied to an electric vehicle or the like has a structure in which a plurality of battery modules respectively including a plurality of battery cells are connected to obtain high output. In addition, each battery cell includes a positive electrode current collector, a negative electrode current collector, a separator, an active material, an electrolyte, and the like an electrode assembly, and may be repeatedly charged and discharged by an electrochemical reaction between the components.

Recently, as the need for a large-capacity structure increases along with utilization as an energy storage source, the demand for a battery pack having a multi-module structure in which a plurality of battery modules having a plurality of secondary batteries connected in series and/or in parallel are aggregated is increasing. The battery pack is designed to accommodate as many battery modules as possible in a limited space by closely arranging the plurality of battery modules in a front and rear direction in order to increase the energy density. Here, each battery module refers to an assembly including cylindrical cells and a cell housing for accommodating the cylindrical cells. As the battery modules are electrically connected in series with each other by a metal plate, the battery pack has high output.

Referring to FIG. 1, for example, one metal plate 1 is in contact with positive electrode terminals of the cylindrical cells of one battery module, and another metal plate 2 is in contact with negative electrode terminals of cylindrical cells of another battery module. These two metal plates are disposed to be partially overlapped on a side surface of a module stack, and the corresponding overlapped portions are welded to connect the battery modules in series.

However, in the conventional battery pack, since unit battery modules are continuously densely arranged, metal plates that should not be in contact with each other when an external impact is applied may contact each other to cause a short circuit.

In addition, the metal plates are exposed at outer sides of the side surfaces of the unit battery modules, and a gap therebetween is also narrow, so there is a risk of short circuit caused by an accidental contact of any metal pieces before/after welding due to the mistake of a worker.

Accordingly, there is a need to improve the structure of the battery pack, at which a short circuit may easily occur due to an external impact or a contact between metal plates before/after a welding work.

DISCLOSURE

Technical Problem

The present disclosure is designed to solve the problems of the related art, and therefore the present disclosure is directed to providing a battery pack having a reinforced short circuit prevention structure that may eliminate the possibility of contact between metal plates when an external impact is applied and also significantly reduce the risk of short circuit before/after a welding work.

Technical Solution

In one aspect of the present disclosure, there is provided a battery pack, comprising: a plurality of cell assemblies respectively including battery cells having electrode terminals formed at upper and lower portions thereof and a cell housing for accommodating the battery cells so that the electrode terminals are exposed to the outside, the plurality of cell assemblies being arranged in a front and rear direction; a first metal plate mounted at a top portion of the cell housing and integrally contacting the upper electrode terminals of the battery cells; and a second metal plate mounted at a bottom portion of the cell housing and integrally contacting the lower electrode terminals of the battery cells, wherein the cell housing includes a side portion that has a slit forming a gap into which a part of the first metal plate and a part of the second metal plate are bent and inserted in an upper and lower direction and a perforated hole formed in a direction intersecting the slit, and the bent part of the first metal plate mounted to any one cell housing is overlapped with the bent part of the second metal plate mounted to another the cell housing adjacent thereto inside the perforated hole.

The side portion of the cell housing may include an outer sidewall and an inner sidewall that form a double wall structure, and the slit may be formed in a height direction between the outer sidewall and the inner sidewall.

The perforated hole may be formed in the outer sidewall.

The side portion of the cell housing may further include a short circuit prevention block configured to connect the outer sidewall and the inner sidewall inside the slit and divide an inner space of the slit.

The first metal plate may include a first terminal contact portion configured to cover the top portion of the cell housing; and first bent portions bent and extending from both ends of the first terminal contact portion and disposed to be inserted into the slit, and the second metal plate may include a second terminal contact portion configured to cover the bottom portion of the cell housing; and second bent portions bent and extending from both ends of the second terminal contact portion and disposed to be inserted into the slit.

The cell housing may include a bottom cover configured to accommodate a part of the battery cells; and a top cover assembled with the bottom cover in an upper and lower direction and configured to accommodate the remaining part of the battery cells.

A part of the perforated hole may be formed in the bottom cover and the remaining part of the perforated hole may be formed in the top cover.

The cell housing may include a coupling protrusion formed at a front surface thereof to protrude outward; and a guide groove formed at a rear surface thereof to be recessed inward.

The battery pack may comprise a first cell module and a second cell module respectively provided as one assembly in which the cell assemblies are assembled successively in a front and rear direction, and the second cell module may be stacked on the first cell module.

The battery pack may further comprise a heat dissipation plate assembled as an interlayer between the first cell module and the second cell module, and the heat dissipation plate may include a middle plate interposed between the first cell module and the second cell module; and vertical plates extending in an upper and lower direction at both ends of the middle plate to surround a front side and a rear side of the first cell module and the second cell module.

A heat transfer pad may be further interposed at a contact interface between an upper surface of the first cell module and a lower surface of the middle plate and between a lower surface of the second cell module and an upper surface of the middle plate.

In another aspect of the present disclosure, there is also provided an electric vehicle, comprising the battery pack described above.

Advantageous Effects

According to an embodiment of the present disclosure, it is possible to provide a battery pack having a reinforced short circuit prevention structure that may eliminate the possibility of contact between metal plates when an external impact is applied and also significantly reduce the risk of short circuit before/after a welding work.

In particular, since the cell housing of the battery pack according to the present disclosure is configured so that the end of the metal plate is inserted into the slit provided at the side surface, it is possible to minimize the exposure of the metal plate to the outside and secure fixability at the same time.

In addition, since the short circuit prevention block inside the slit acts as a physical barrier between adjacent metal plates, the risk of short circuit may be significantly reduced when an external impact is applied.

The effect of the present disclosure is not limited to the above, and effects not mentioned herein may be clearly understood by those skilled in the art from the specification and the accompanying drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
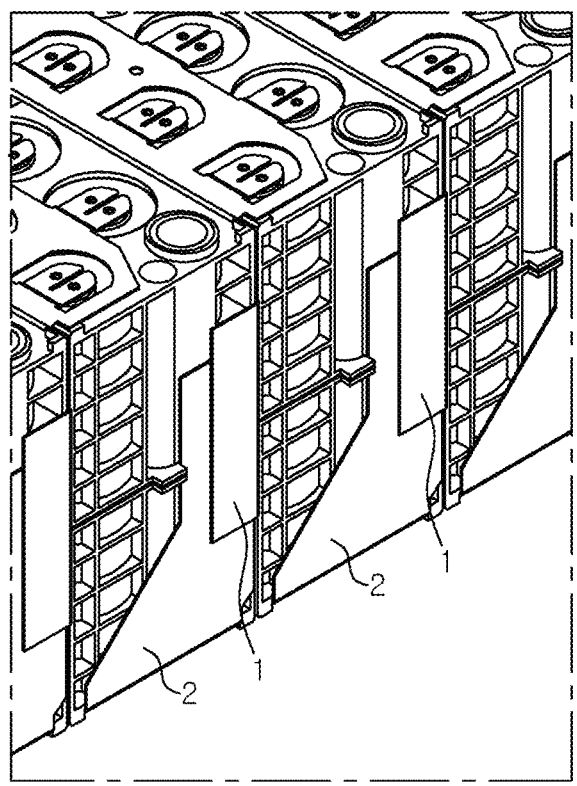
FIG. 1 is a reference view schematically showing an electrical connection structure by metal plates in a conventional battery pack.
Figure 2:
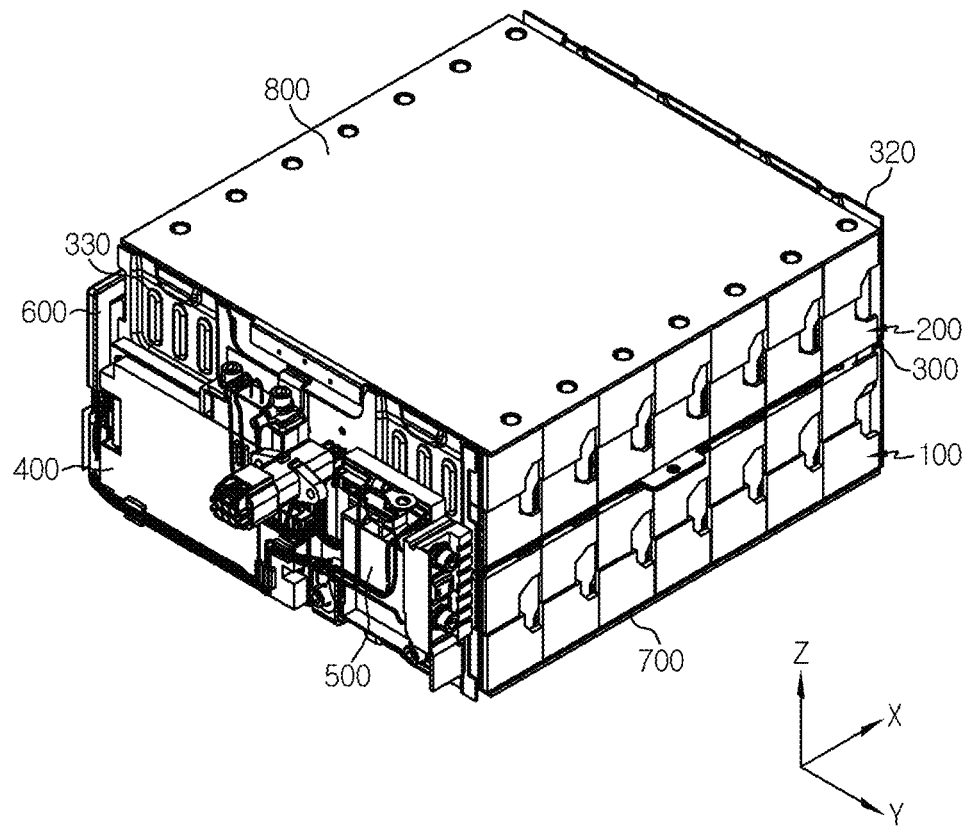
FIG. 2 is a perspective view schematically showing a configuration of a battery pack according to an embodiment of the present disclosure.
Figure 3:
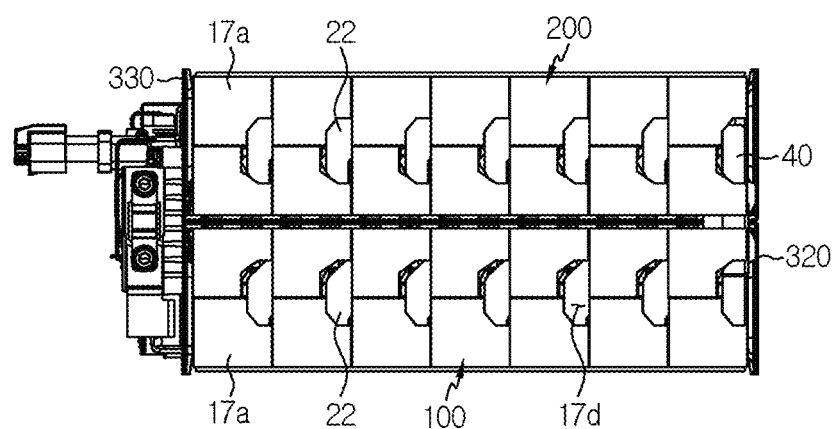
FIG. 3 is a side view of FIG. 2.
Figure 4:
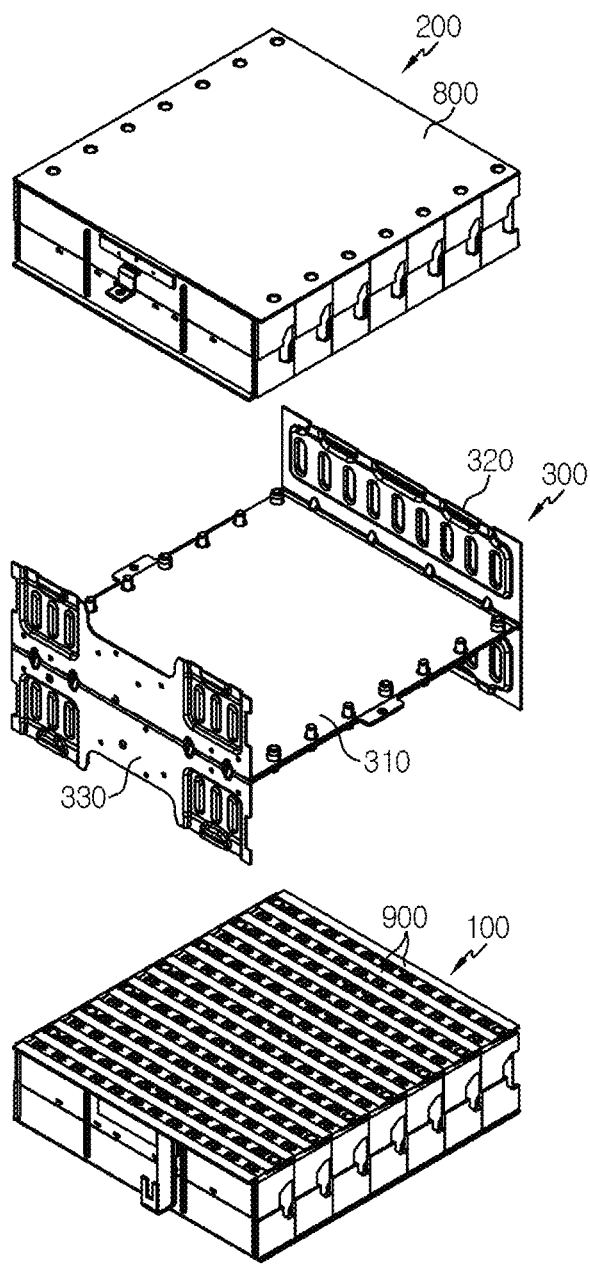
FIG. 4 is an exploded perspective view showing a first cell module, a heat dissipation plate and a second cell module of FIG. 3.

FIG. 2 is a perspective view schematically showing a configuration of a battery pack according to an embodiment of the present disclosure, FIG. 3 is a side view of FIG. 2, and FIG. 4 is an exploded perspective view showing a first cell module, a heat dissipation plate and a second cell module of FIG. 3.

Referring to the drawings, a battery pack according to an embodiment of the present disclosure includes a first cell module 100 that is an aggregate of a plurality of battery cells 11, a second cell module 200 disposed on the first cell module 100, a heat dissipation plate 300 assembled between the first cell module 100 and the second cell module 200, and various devices for controlling charging and discharging of the battery cells 11, for example a BMS 400, a relay 500, a voltage sensing means 600, a current sensor, a fuse, or the like.

A main feature of the present disclosure is an assembly structure of cell assemblies 10, which are components of the first and second cell modules 200, and a short circuit prevention structure to eliminate the risk of short circuits between metal plates when an external impact is applied, and thus these main features will be explained in detail. Meanwhile, since the electronic components such as the BMS 400, the current sensor and the fuse are well known in the art, and thus their general operations and assembly structures will be easily understood by those skilled in the art.

Seeing main components forming the first and second cell modules 100 and 200, the first and second cell modules 100, 200 may include a plurality of cell assemblies 10 and first and second metal plates 20, 30.

The first and second cell modules 100, 200 may be regarded as components in which the cell assemblies 10 are assembled successively in a front and rear direction and electrically connected by the first and second metal plates 20, 30.

In the battery pack of this embodiment, the first cell module 100 and the second cell module 200 are arranged in a two-layer structure to increase capacity and energy density, but it is also possible to change the design of the battery pack to a single-layer structure including only the first cell module 100 or to a three- or four-layer structure including a third cell module and/or a fourth cell module further.

The heat dissipation plate 300 may include a middle plate 310 and vertical plates 320, 330. Specifically, referring to FIGS. 3 to 4, the middle plate 310 may be disposed as an interlayer between the first cell module 100 and the second cell module 200, and the vertical plates 320, 330 may extend in an upper and lower direction at both ends of the middle plate 310 to cover front and rear sides of the first cell module 100 and the second cell module 200.

In addition, a heat transfer pad 900 may be further interposed at a contact interface between an upper surface of the first cell module 100 and a lower surface of the middle plate 310 and between a lower surface of the second cell module 200 and an upper surface of the middle plate 310.

On the lower surface of the first cell module 100 and the upper surface of the second cell module 200, upper and lower pads 700, 800 respectively having excellent heat transfer rates and a cooling medium (not shown) in contact with the upper and lower pads 700, 800 to absorb heat may be disposed.

According to this configuration, the heat of the battery cells 11 generated during charging and discharging of the battery pack may be dissipated to the outside through the lower portion of the first cell module 100 and the upper portion of the second cell module 200. In particular, since the middle plate 310 and the heat dissipation plate 300 act as a heat transfer path between the first cell module 100 and the second cell module 200, the heat at the upper portion of the first cell module 100 and the lower portion of the second cell module 200 may be smoothly dissipated. In addition, the middle plate 310 and the heat dissipation plate 300 may act as a firewall when the first cell module 100 ignites or explode due to some reason, thereby preventing chain fire or chain explosion to the second cell module 200.

Figure 5:
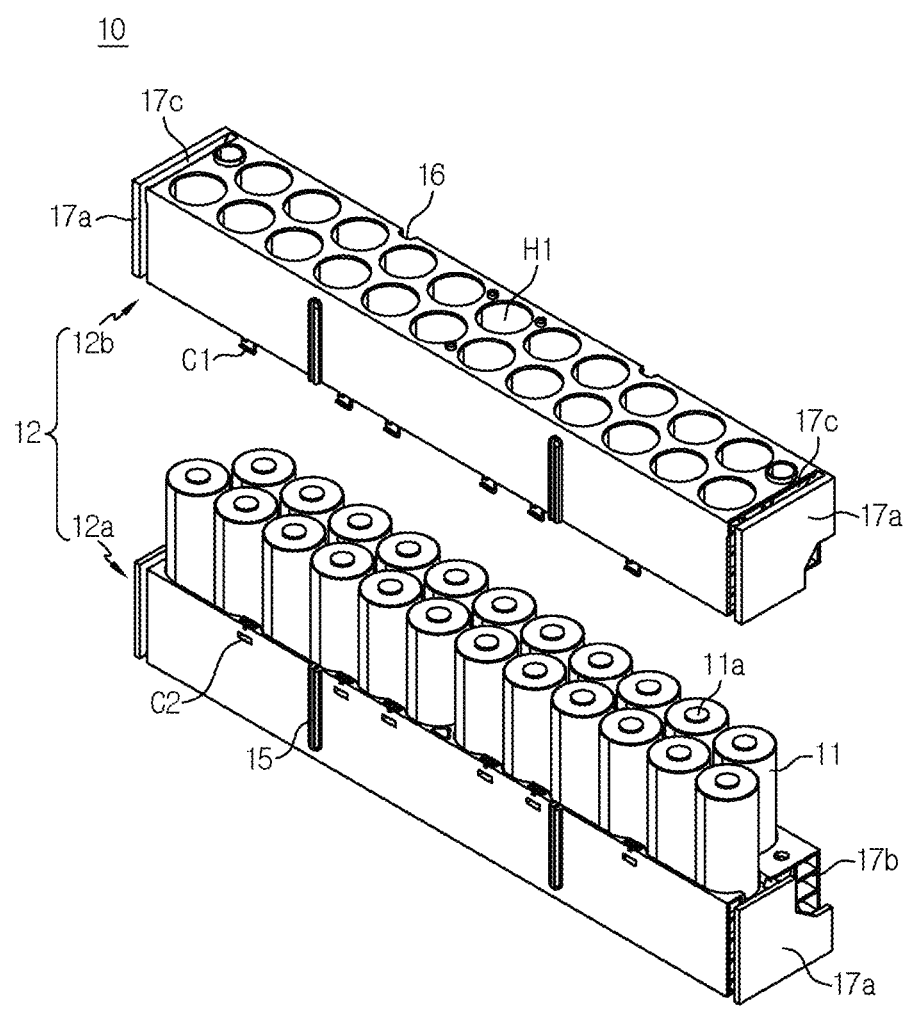
FIG. 5 is an exploded perspective view showing a part of a unit cell assembly according to an embodiment of the present disclosure.
Figure 6:
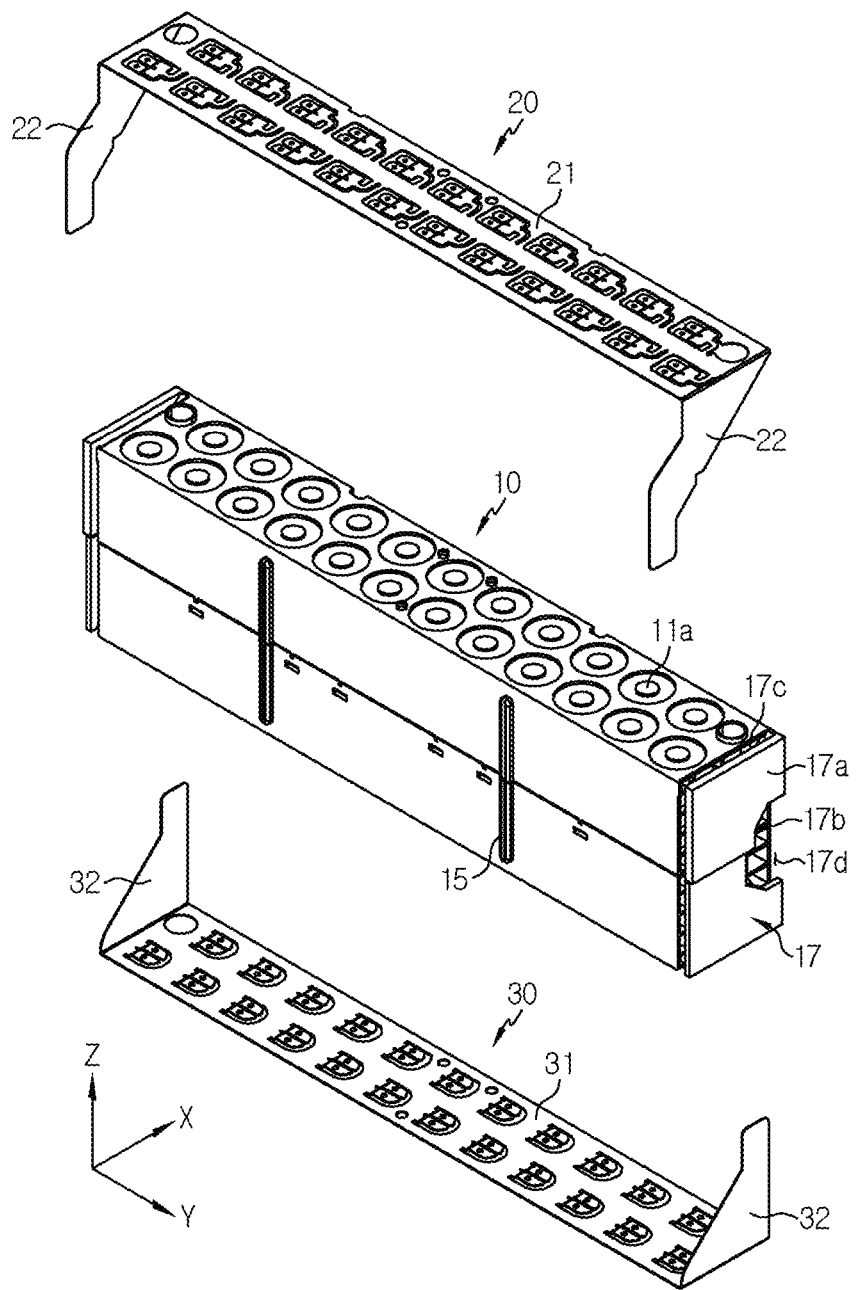
FIGS. 6 and 7 are diagrams for illustrating an assembling process of the cell assembly and the metal plate according to an embodiment of the present disclosure.

The cell assembly 10 includes battery cells 11 and a cell housing 12 for accommodating the battery cells 11, as shown in FIGS. 5 and 6.

The battery cell 11 may be a cylindrical battery cell 11 having electrode terminals respectively formed at upper and lower portions thereof. The cylindrical battery cell 11 generally includes a jelly-roll type electrode assembly, a cylindrical metal battery can having an inner space to accommodate the electrode assembly and an open top, and a cap assembly formed to shield the top portion of the battery can. Here, the cap assembly forms a positive electrode terminal 11a, and the bottom surface of the battery can forms a negative electrode terminal. In addition, a side of the battery can may be covered with an insulating film.

In this embodiment, the cylindrical battery cell 11 is used as the battery cell 11, but the battery cell 11 does not necessarily have a cylindrical shape. For example, the battery cell 11 may be preferably a secondary battery of a metal can type with high mechanical stiffness, which has a polygonal shape.

The cell housing 12 may include a bottom cover 12a for accommodating a part of the battery cells 11, and a top cover 12b assembled on an upper portion of the bottom cover 12a to accommodate the remaining part of the battery cells 11.

Each of the bottom cover 12a and the top cover 12b may include sockets into which the cylindrical battery cells 11 are inserted one by one, and the sockets may support the cylindrical battery cells 11 to stand upright. In addition, circular holes H1 may be provided in the lower surface of the bottom cover 12a and the upper surface of the top cover 12b at locations corresponding to the sockets in the upper and lower direction.

After the cylindrical battery cells 11 are inserted into the bottom cover 12a, if the top cover 12b is assembled with the bottom cover 12a and the upper portion of the cylindrical battery cells 11 is covered, the cylindrical battery cells 11 may be constrained in the cell housing 12 not to move, and only the positive electrode terminals 11a and the negative electrode terminals of the cylindrical battery cells 11 may be exposed out of the cell housing 12 through the holes H1 of the bottom cover 12a and the hole H1 of the top cover 12b.

For convenient assembly of the bottom cover 12a and the top cover 12b, for example, locking protrusions C1 may be provided along the circumferential direction of the front surface and the rear surface of the top cover 12b, and locking holes C2 capable of being locked with the locking protrusions C1 may be provided at the front surface and the rear surface of the bottom cover 12a.

In addition, the cell housing 12 may further include a coupling protrusion 15 formed to protrude outward from the front surface thereof, and a guide groove 16 formed at the rear surface to be recessed inward.

Figure 7:
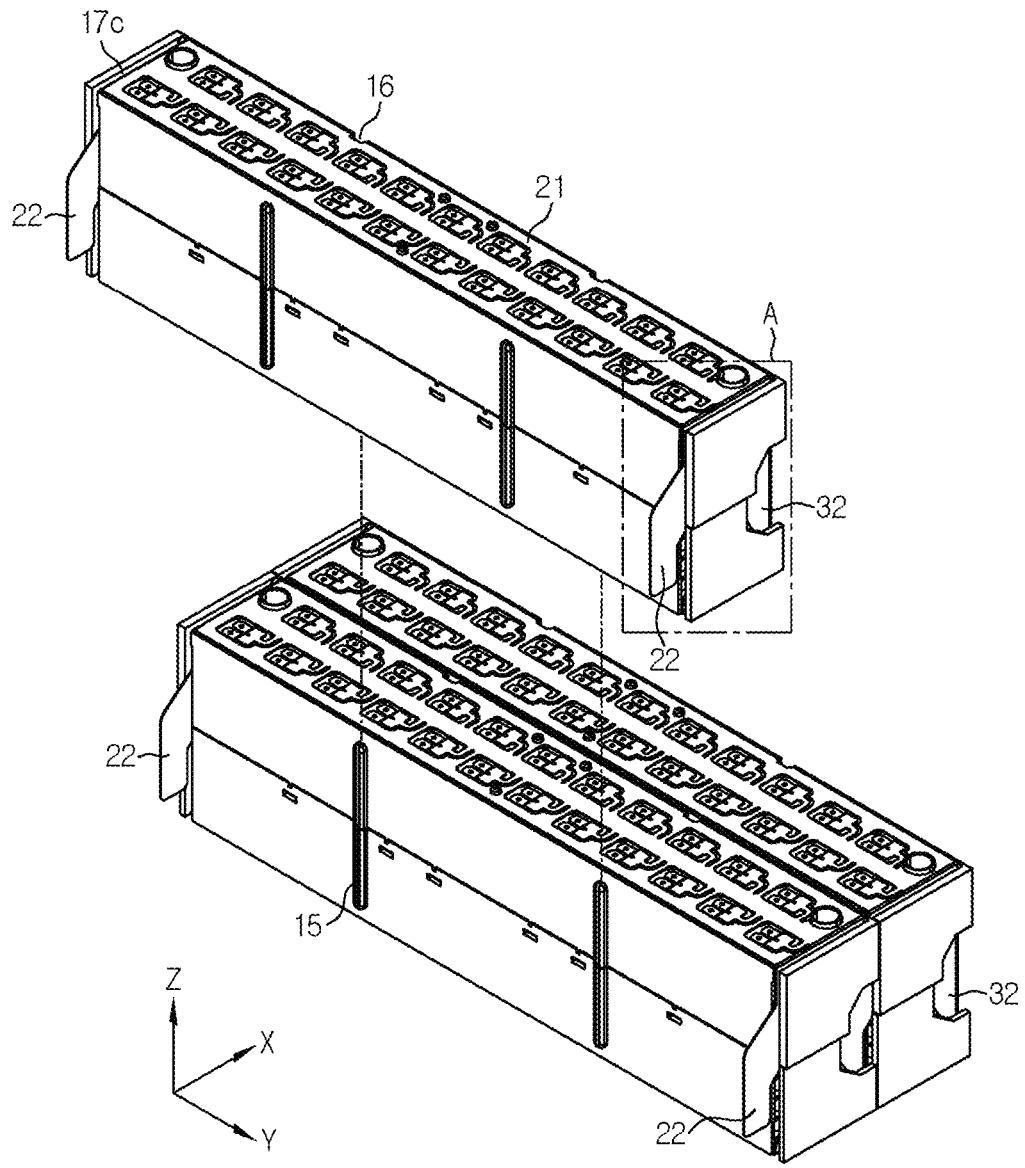
Figure 8:
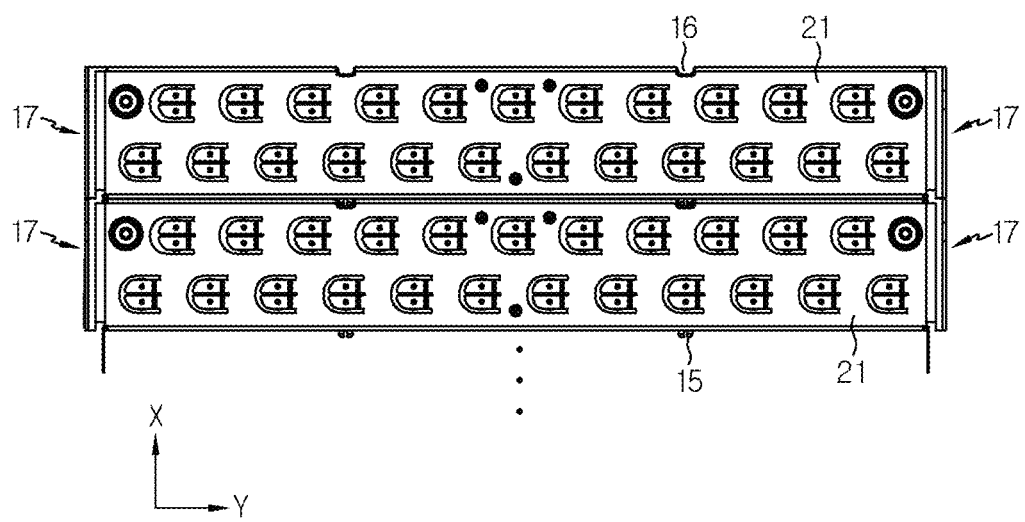
FIG. 8 is a plan view showing the cell assemblies of FIG. 6.

For example, as shown in FIGS. 7 and 8, the cell housing 12 may include two coupling protrusions 15 at the front surface thereof and include two guide grooves 16 corresponding to the coupling protrusion 15 at the rear surface thereof.

The coupling protrusion 15 and the guide groove 16 of the cell housing 12 may be used as a means for successively assembling several cell housings 12 in a front and rear direction. That is, two cell housings 12 may be assembled by inserting the coupling protrusion 15 of one cell housing 12 into the guide groove 16 of the other cell housing 12 in the upper and lower direction. In this case, since assembling is performed based on the coupling protrusion 15 and the guide groove 16, there is no positional error between the cell housings 12. Also, since the coupling protrusion 15 and the guide groove 16 are engaged with each other, the cell housings 12 may not be easily separated.

The shapes of the coupling protrusion 15 and the guide groove 16 are not limited to this embodiment, and for example, the coupling protrusion 15 and the guide groove 16 may have a cross section of a "T" shape or the like.

Referring to FIGS. 6 and 7 again, the battery pack of the present disclosure includes a metal plate as an electrical connection means for the cylindrical battery cells 11. The metal plate includes a first metal plate 20 mounted at a top portion of the cell housing 12 and is integrally in contact with the positive electrode terminals 11a of the cylindrical battery cells 11, and a second metal plate 30 mounted at a bottom portion of the cell housing 12 and is integrally in contact with the lower electrode terminals of the cylindrical battery cells 11.

The cylindrical battery cells 11 are accommodated in each cell housing 12 such that the same polarity is oriented in the same direction. That is, the cylindrical battery cells 11 are disposed to stand upright so that the positive electrode terminals 11a face the top portion of the cell housing 12 and the negative electrode terminals face the bottom portion of the cell housing 12.

The first metal plate 20 integrally contacts the positive electrode terminals 11a of the cylindrical battery cells 11, and the second metal plate 30 integrally contacts the negative electrode terminals 11a of the cylindrical battery cells 11. Therefore, the first metal plate 20 gives the same function as the positive electrode terminal of one cell assembly 10, and the second metal plate 30 gives the same function as the negative electrode terminal of the one cell assembly 10. Of course, if the cylindrical battery cells 11 are disposed to stand up so that the negative electrode terminals face the top portion of the cell housing 12 and the positive electrode terminals face the bottom portion of the cell housing 12, the first metal plate 20 may function as the negative electrode terminal and the second metal plate 30 may function as the positive electrode terminal.

One cell assembly 10 according to this embodiment is configured such that the cylindrical battery cells 11 are connected in parallel by the first and second metal plates 20, 30, thereby providing very high electrical capacity. If it is required to increase or decrease the electrical capacity per cell assembly 10, it is possible to add or reduce the number of cylindrical battery cells 11 included in the cell assembly 10.

In addition, the total output of the battery pack may be increased as desired by connecting a plurality of cell assemblies 10 in series as needed. That is, the output may be increased by connecting the cell assemblies 10 in series such that the positive electrode terminal of one cell assembly 10 is connected to the negative electrode terminal of another cell assembly 10.

In the present disclosure, in order to connect the cell assemblies 10 in series with each other in a space-efficient way, both ends of the first and second metal plates 30 are bent and placed on both side portions 17 of the cell housing 12, the cell assemblies 10 are successively assembled in the front and rear direction, and then the first and second metal plates 30 of the cell assemblies 10 are connected.

Specifically, referring to FIGS. 6, 7 and 9 again, the first metal plate 20 includes a first terminal contact portion 21 having an approximately wide plate-like shape and provided to cover the top portion of the cell housing 12, and first bent portions 22 bent and extending downward from both ends of the first terminal contact portion 21, and the second metal plate 30 has a shape similar to the first metal plate 20 and includes a second terminal contact portion 31 provided to cover the bottom portion of the cell housing 12 and second bent portions 32 bent and extending upward from both ends of the second terminal contact portion 31.

In addition, the first bent portion 22 and the second bent portion 32 are arranged side by side on the side portion 17 of the cell housing 12, respectively, and may be used as a means to connect the cell assemblies 10 in series. For example, the first bent portion 22 of any one cell assembly 10 may extend obliquely downward perpendicular to the first terminal contact portion 21 beyond the range of width (W) of the cell housing 12. If two cell assemblies 10 are assembled, one first bent portion 22 comes into contact with the other second bent portion 32, and the corresponding contact portions are welded to connect the two cell assemblies 10 in series. In this way, all cell assemblies 10 may be connected in series.

Meanwhile, in the present disclosure, in order to eliminate the risk of short circuit between the metal plates, the first bent portion 22 and the second bent portion 32 are structured to be hidden by the side portion 17 of the cell housing 12.

To this end, the cell housing 12 may further include a side portion 17 having a slit 17c forming a gap in which the first bent portion 22 of the first metal plate 20 and the second bent portion 32 of the second metal plate 30 may be inserted in the upper and lower direction, respectively, and a perforated hole 17d formed in a direction intersecting the slit 17c.

The side portion 17 of the cell housing 12 may include an outer sidewall 17a and an inner sidewall 17b that form a double wall structure, and the slit 17c may be formed in a height direction between the outer sidewall 17a and the inner sidewall 17b. In other words, the outer sidewall 17a and the inner sidewall 17b are spaced apart from each other so that the slit 17c is provided (in ±Y-axis direction), and the first bent portion 22 and the second bent portion 32 may be inserted into the slit 17c (in ±Z-axis direction). At this time, if the first bent portion 22 of the first metal plate 20 and the second bent portion 32 of the second metal plate 30 inserted into the side portion 17 of the same cell housing 12 come into contact with each other, they are short-circuited. Thus, the first bent portion 22 of the first metal plate 20 and the second bent portion 32 of the second metal plate 30 may be provided to extend obliquely in the upper and lower direction oppositely so as not to contact each other inside the slit 17c.

In addition, the perforated hole 17d communicating with the slit 17c may be formed in the outer sidewall 17a. More specifically, the bottom cover 12a and the top cover 12b are provided to be partially cut, and the bottom cover 12a and the top cover 12b having the partially cut area are coupled up and down to provide the perforated hole 17d. The perforated hole 17d may be used as a place for welding the metal plates, as will be described later.

The side portion 17 of the cell housing 12 may further include a short circuit prevention block 17e configured to connect the outer sidewall 17a and the inner sidewall 17b inside the slit 17c and divide the inner space of the slit 17c.

Although the outer sidewall 17a is spaced apart from the inner sidewall 17b by a predetermined distance, the outer sidewall 17a is connected to the inner sidewall 17b via the short circuit prevention block 17e, and thus may be formed as one body together with the inner sidewall 17b.

The short circuit prevention block 17e may be provided to approximately divide the inner space of the slit 17c into left and right areas. The first bent portion 22 of the first metal plate 20 may be disposed in the divided left space of the short circuit prevention block 17e, and the second bent portion 32 of the second metal plate 30 may be disposed in the right space of the short circuit prevention block 17e.

Figure 9:
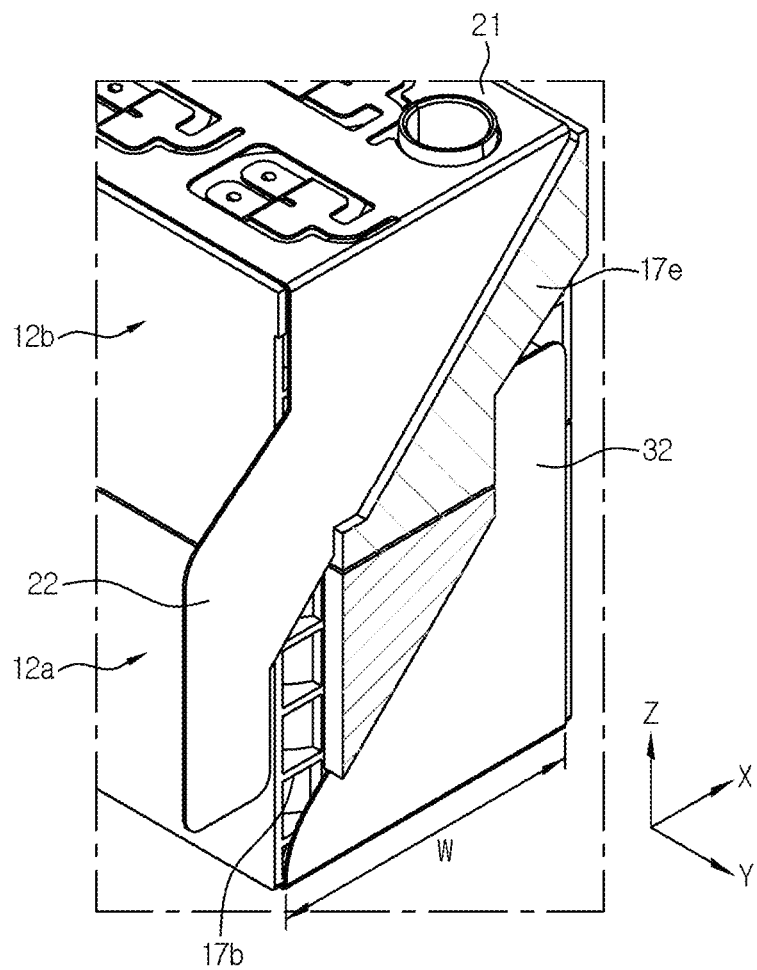
FIG. 9 is a sectioned perspective view corresponding to a portion A of FIG. 7 and showing a structure of an inner side of an outer sidewall at the side portion of the cell housing.

As shown in FIG. 9, the short circuit prevention block 17e functions as a barrier to physically isolate the first bent portion 22 of the first metal plate 20 and the second bent portion 32 of the second metal plate 30 in the inner space of the slit 17c. In other words, since the first bent portion 22 of the first metal plate 20 and the second bent portion 32 of the second metal plate 30 mounted to the same cell housing 12 are arranged to miss each other with the short circuit prevention block 17e being interposed therebetween, it is possible to fundamentally block the first bent portion 22 of the first metal plate 20 and the second bent portion 32 of the second metal plate 30 from contacting each other.

Therefore, in the assembly process in which the first bent portion 22 of the first metal plate 20 and the second bent portion 32 of the second metal plate 30 are inserted at the upper portion and the lower portion of the side portion 17 of the cell housing 12, the first bent portion 22 of the first metal plate 20 and the second bent portion 32 of the second metal plate 30 are guided to miss each other into two parts based on the short circuit prevention block 17e, respectively, so as to be mounted without contacting each other, thereby greatly lowering the risk of short circuit. In addition, even if a shock is applied from the outside (in the X-axis, Y-axis, Z-axis directions) after assembly, the first bent portion 22 of the first metal plate 20 and the second bent portion 32 of the second metal plate 30, which are mounted to the same cell housing 12, has little chance of contacting each other and thus causing a short circuit.

Meanwhile, the first metal plate 20 mounted on any one cell housing 12 may be disposed to overlap with the second metal plate 30 mounted to another the cell housing 12 adjacent thereto, inside the perforated hole 17d.

Figure 10:
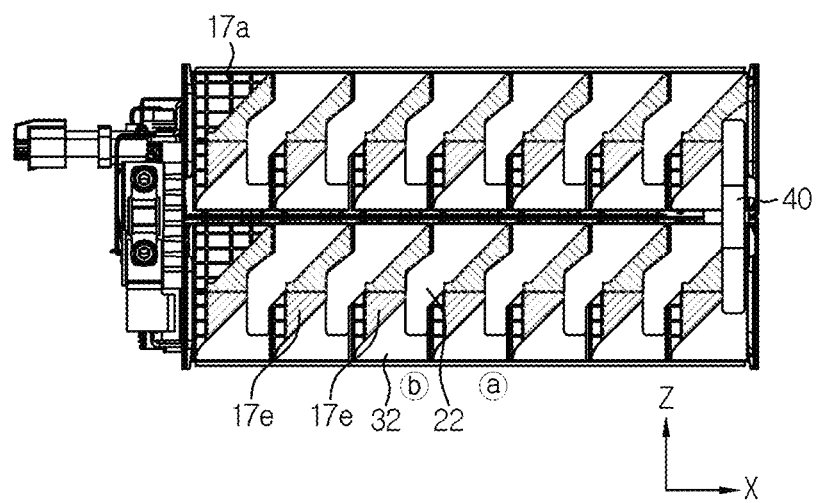
FIG. 10 is a diagram corresponding to FIG. 3 and showing a connection structure of the metal plates of the battery pack according to an embodiment of the present disclosure.
Figure 11:
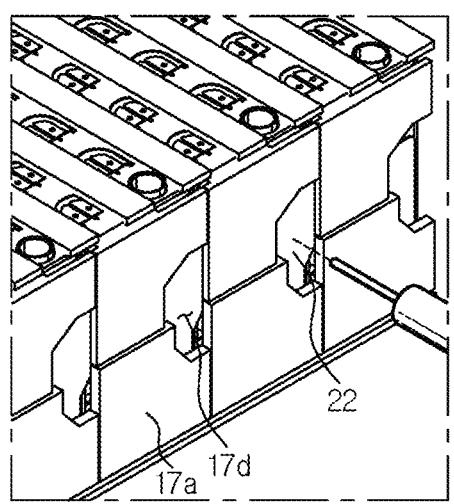
FIG. 11 is a schematic view for illustrating a welding process between the metal plates according to an embodiment of the present disclosure.

Referring to FIGS. 10 and 11, the first bent portion 22 of the first metal plate 20 mounted to the ⓐ cell housing 12 may be disposed over the slit 17c of the ⓐ cell housing 12 and the slit 17c of the ⓑ cell housing 12 to overlap with the second bent portion 32 of the second metal plate 30 mounted to the ⓑ cell housing 12. In addition, the overlapped area may be exposed to the outside through the perforated hole 17d of the ⓑ cell housing 12.

The first metal plate 20 of the ⓐ cell housing 12 and the second metal plate 30 of the ⓑ cell housing 12 may be connected to each other by laser welding through the perforated hole 17d of the ⓑ cell housing 12.

According to the configuration of the present disclosure, the welding work is easy because parts of the metal plates to be welded are fixedly located within the slit 17c of the cell housing 12. In addition, since the metal plates are hidden inside the outer sidewall 17a of the cell housing 12, a short circuit is substantially not generated even if a worker accidentally brings a welding jig or metal tool into contact with the side portion 17 of the cell housing 12 before/after performing the welding work.

The first cell module 100 and the second cell module 200 may be configured by connecting the cell assemblies 10 in series in the above pattern. In addition, the first cell module 100 and the second cell module 200 may be electrically connected to each other by a module connecting bus bar 40 provided in a metal plate shape. For example, the module connecting bus bar may connect the second metal plate 30 of a cell assembly 10 located last in the first cell module 100 and the second metal plate 30 of a cell assembly 10 located last in the second cell module 200. For reference, in this embodiment, the battery cells 11 of the second cell module 200 are placed to stand upright such that the positive electrode terminals face downward and the negative electrode terminals face upward, as opposed to the first cell module 100. Therefore, all of the first metal plates 20 of the second cell module 200 have negative polarity and all of the second metal plates 30 have positive polarity. It is desirable to secure insulation by further attaching an insulation pad on a path where the module connecting bus bar is disposed.

As described above, according to the configuration of the present disclosure, it is possible to provide a battery pack having a reinforced short circuit prevention structure that may eliminate the possibility of contact between metal plates when an external impact is applied and also significantly reduce the risk of short circuit before/after a welding work.

Meanwhile, the battery pack according to the present disclosure as described above may be applied to a large-capacity energy storage system or a vehicle such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery pack, comprising:
   a first cell assembly including battery cells having electrode terminals at upper and lower portions thereof and a cell housing for accommodating the battery cells so that the electrode terminals are exposed to an outside of the cell housing;
   a first metal plate mounted at a top portion of the cell housing and directly contacting the upper electrode terminals of the battery cells; and
   a second metal plate attached at a bottom portion of the cell housing and directly contacting the lower electrode terminals of the battery cells,
   wherein the cell housing includes a cover main body and a side portion connected with one side of the cover main body at an end of the cover main body to define a slit along three sides of the cover main body and defining a gap between the cover main body and the side portion, a first bent part of the first metal plate and a second bent part of the second metal plate are bent and inserted in an upper and lower direction into the slit,
   wherein the side portion includes a hole in a direction intersecting the slit, and
   wherein the first bent part of the first metal plate extends from the slit to the outside of the cell housing to be overlapped with and electrically connected with a second cell assembly.

2. The battery pack according to claim 1, wherein the side portion of the cell housing includes an outer sidewall and an inner sidewall that form a double wall structure, and the slit is formed in a height direction between the outer sidewall and the inner sidewall.

3. The battery pack according to claim 2, wherein the hole is formed in the outer sidewall as a perforated hole.

4. The battery pack according to claim 2, wherein the side portion of the cell housing further includes a short circuit prevention block configured to connect the outer sidewall and the inner sidewall inside the slit and divide an inner space of the slit.

5. The battery pack according to claim 1, wherein the first metal plate includes:
   a first terminal contact portion configured to cover the top portion of the cell housing; and
   the first bent part bent and extending from an end of the first terminal contact portion and disposed to be inserted into the slit, and wherein the second metal plate includes:
   a second terminal contact portion configured to cover the bottom portion of the cell housing; and
   the second bent part bent and extending from an end of the second terminal contact portion and disposed to be inserted into the slit.

6. The battery pack according to claim 1, wherein the cover main body of the cell housing includes:
   a bottom cover configured to accommodate a part of the battery cells; and a top cover assembled with the bottom cover in an upper and lower direction and configured to accommodate the remaining part of the battery cells.

7. The battery pack according to claim 6, wherein a part of the hole is formed in the bottom cover and the remaining part of the hole is formed in the top cover.

8. The battery pack according to claim 1, wherein the cell housing includes:
   a coupling protrusion formed at a front surface thereof to protrude outward; and
   a guide groove formed at a rear surface thereof to be recessed inward.

9. The battery pack according to claim 1, wherein the battery pack comprises a first cell module and a second cell module respectively provided as one assembly in which a plurality of the cell assemblies are assembled successively in a front and rear direction, and the second cell module is stacked on the first cell module.

10. The battery pack according to claim 9, further comprising:
   a heat dissipation plate assembled as an interlayer between the first cell module and the second cell module, wherein the heat dissipation plate includes:
      a middle plate interposed between the first cell module and the second cell module; and
      vertical plates extending in an upper and lower direction at both ends of the middle plate to surround a front side and a rear side of the first cell module and the second cell module.

11. The battery pack according to claim 10, wherein a heat transfer pad is further interposed at a contact interface between an upper surface of the first cell module and a lower surface of the middle plate and between a lower surface of the second cell module and an upper surface of the middle plate.

12. A vehicle, comprising the battery pack according claim 1.

* * * * *